US012585538B2

(12) United States Patent
Gohain et al.

(10) Patent No.: US 12,585,538 B2
(45) Date of Patent: ***Mar. 24, 2026

(54) DETERMINING LOCATIONS IN NAND MEMORY FOR BOOT-UP CODE

(71) Applicant: Micron Technology, Inc., Boise, ID (US)

(72) Inventors: Nitul Gohain, Bangalore (IN); Giuseppe Cariello, Boise, ID (US); Jameer Mulani, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 29 days.

This patent is subject to a terminal disclaimer.

(21) Appl. No.: 18/420,888

(22) Filed: Jan. 24, 2024

(65) Prior Publication Data

US 2024/0241790 A1 Jul. 18, 2024

Related U.S. Application Data

(63) Continuation of application No. 17/804,826, filed on May 31, 2022, now Pat. No. 11,899,532.

(51) Int. Cl.
| | |
|---|---|
| *G06F 11/10* | (2006.01) |
| *G06F 3/06* | (2006.01) |
| *G06F 11/07* | (2006.01) |

(52) U.S. Cl.
CPC ........ *G06F 11/1068* (2013.01); *G06F 3/0619* (2013.01); *G06F 3/0632* (2013.01); *G06F 3/0659* (2013.01); *G06F 3/0679* (2013.01);

*G06F 11/0757* (2013.01); *G06F 11/076* (2013.01); *G06F 11/0772* (2013.01)

(58) Field of Classification Search
None
See application file for complete search history.

(56) References Cited

U.S. PATENT DOCUMENTS

| | | | | | |
|---|---|---|---|---|---|
| 5,325,529 | A | * | 6/1994 | Brown | G06F 9/4416 |
| | | | | | 713/1 |
| 9,367,515 | B1 | * | 6/2016 | Myers | G06F 1/3246 |
| 9,792,128 | B2 | * | 10/2017 | Fallon | G06F 3/0638 |
| 2006/0236150 | A1 | * | 10/2006 | Lintz, Jr. | G06F 11/1417 |
| | | | | | 714/6.13 |
| 2016/0210161 | A1 | * | 7/2016 | Rosset | G06F 9/4408 |
| 2020/0159302 | A1 | * | 5/2020 | Chaiken | G06F 1/24 |
| 2021/0173588 | A1 | * | 6/2021 | Kannan | G06F 3/0659 |
| 2023/0087462 | A1 | * | 3/2023 | Yoon | G06F 3/0658 |
| | | | | | 713/173 |

* cited by examiner

*Primary Examiner* — Daniel F. McMahon
(74) *Attorney, Agent, or Firm* — Holland & Hart LLP

(57) ABSTRACT

Methods, systems, and devices for determining locations in not-and (NAND) memory for boot-up code are described. An indication of one or more timeout durations for a boot sequence are received. Information for the boot sequence is stored in one or more memory cells based on the one or more timeout durations, where the one or more memory cells are selected based on a read latency, an error rate, or a storage-level of the one or more memory cells with relation to the indicated one or more timeout durations. The information for the boot sequence stored in the one or more memory cells is accessed based on an initialization of the boot sequence.

20 Claims, 8 Drawing Sheets

Timeout Component

625

Initialization Component

635

Data Component

630

620

600

Receive an indication of a timeout duration for a boot sequence of a host system

705

Store information for the boot sequence in a set of memory cells based at least in part on the timeout duration

710

Access the information for the boot sequence that is stored in the set of memory cells based at least in part on an initialization of the boot sequence

715

700

| Set a timeout duration for a boot sequence of a host system | 805 |
| Transmit, to a memory device, an indication of the timeout duration for the boot sequence | 810 |
| Initialize the boot sequence to access a set of memory cells of the memory device that store information for the boot sequence based at least in part on the timeout duration | 815 |

800

DETERMINING LOCATIONS IN NAND MEMORY FOR BOOT-UP CODE

CROSS REFERENCE

The present application for patent is a continuation of U.S. patent application Ser. No. 17/804,826 by Gohain et al., entitled "DETERMINING LOCATIONS IN NAND MEMORY FOR BOOT-UP CODE," filed May 31, 2022, assigned to the assignee hereof, and is expressly incorporated by reference in its entirety herein.

FIELD OF TECHNOLOGY

The following relates to one or more systems for memory, including determining locations in not-and (NAND) memory for boot-up code.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

A device may include a host system and a memory system. The memory system may include different memory cells, such as single-level cells that are each used to store two-bits of data, multiple-level cells that are each used to store multiple bits of data (e.g., double-level cells (DLCs), triple-level cells (TLCs), quad-level cells (QLCs)), or both. In some examples, the memory system may store code for initializing the device (e.g., boot-up code) in one of the types of memory cells, such as the multiple-level cells.

Accessing data stored in some memory cells, such as multiple-level cells, may take longer than accessing data stored in other memory cells, such as single-level cells. Also, an average duration and power for accessing data stored in some memory cells, such as multiple-level cells, may be further increased based on or in response to an additional error correction procedures being performed for those memory cells (e.g., multiple-level cells) relative to other memory cells, such as single-level cells. In some examples, the increased access latency and power consumption associated with accessing some memory cells, such as multiple-level cells, may cause an initialization procedure performed by a host system to timeout or fail, and the host system to perform a reinitialization procedure multiple times before a successful initialization procedure can be completed. In some examples, the host system may become stuck in an initialization loop and be unable to successfully complete the initialization procedure.

To reduce a rate of initialization timeouts or failures, techniques for dynamically storing the initialization code in portions of a memory system that reduce the likelihood that a duration for accessing the initialization code will exceed a timeout duration, a power consumption for executing the initialization code will exceed a power threshold, or both, may be used. The techniques may include indicating, to the memory system, one or more timeout durations that are configured for an initialization procedure so that the memory system may determine where to store the initialization code within the memory system such that a likelihood of a timeout duration being exceeded will be reduced.

Features of the disclosure are initially described in the context of systems and subsystems. Features of the disclosure are also described in the context of process flows and timing diagrams. These and other features of the disclosure are further illustrated by and described in the context of apparatus diagrams and flowcharts that relate to determining locations in NAND memory for boot-up code.

Figure 1:
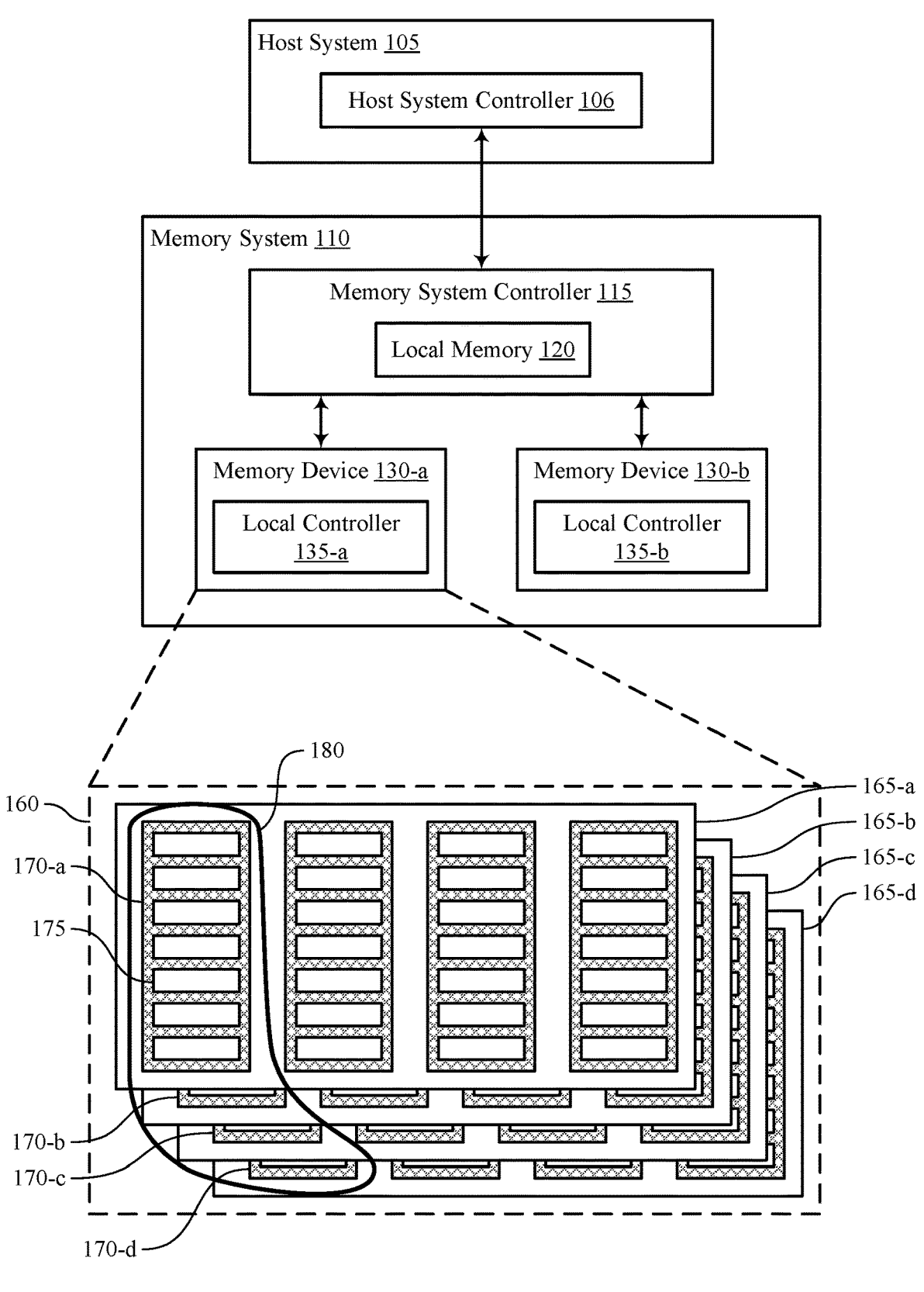
FIG. 1 illustrates an example of a system that supports determining locations in NAND memory for boot-up code in accordance with examples as disclosed herein.

FIG. 1 illustrates an example of a system 100 that supports determining locations in NAND memory for boot-up code in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more memory dies 160. A memory die 160 may, in some examples, be a piece of electronics-grade semiconductor cut from a wafer (e.g., a silicon die cut from a silicon wafer). Each memory die 160 may include one or more planes 165, and each plane 165 may include a respective set of blocks 170, where each block 170 may include a respective set of pages 175, and each page 175 may include a set of memory cells.

In some cases, a memory device 130 (e.g., a NAND memory device) may include memory cells configured to each store one bit of information, which may be referred to as single level cells (SLCs). Additionally or alternatively, a memory device 130 (e.g., a NAND memory device) may include memory cells configured to each store multiple bits of information, which may be referred to as dual-level cells (DLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support determining locations in NAND memory for boot-up code. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

A memory device (e.g., the memory device 130-a) may include cells that are individually used to indicate single data levels (which may be referred to as single-level cells) or multiple data levels (which may be referred to as multiple-level cells). Multiple-level cells may support multiple orders of levels. For example, multiple-level cells may include double-level cells (DLCs), triple-level cells (TLCs), quad-level cells (QLCs), etc. Multiple-level cells may be used to represent $2^n$ logic values, where n may be based on the order of the cell. For example, a double-level cell may be capable of representing up to $2^2$ logic values, a triple-level cell may be capable of representing up to $2^3$ logic values, and so on. In some example, a multi-level cell may be configured to operate with a lower order than is supported by the multi-level cell. For example, a QLC may be configured to operate as an SLC—e.g., by only using two (e.g., the highest and lowest) programmable threshold voltages of the QLC. That is, access operations for an SLC may be used to access a QLC.

Operations for accessing (e.g., reading or writing) different types of multiple-level cells may have differences from one another. For example, an operation for accessing a QLC may take longer than an operation for accessing an SLC. In some examples, a higher-order cell that is configured to operate with a lower order may be accessed using a lower-order access operation. Additionally, error handling rates may differ across the different types of multiple-level cells. For example, the raw bit error rate for QLCs may be higher than the raw bit error rate for SLCs. Accordingly, error handling procedures—e.g., a turbo redundant array of independent NAND (TurboRAIN) process—used to correct bit errors may be performed more frequently for QLCs than SLCs, which, in turn, may increase an average latency, average power, or both, associated with accessing QLCs. In some examples, an error handling procedure takes up to two seconds.

The system 100 may be incorporated into a device (e.g., a mobile device or an electronic component of an automotive device). In some examples, the device may be transitioned (e.g., by a user) from a powered-down mode to a powered-on mode. When transitioning to the powered-on mode, the system 100 may perform an initialization procedure (which may be or include a boot-up sequence) before the device is accessible for advertised operations (e.g., user operations, I/O operations, etc.). A boot-up sequence may include multiple stages. For example, for a mobile device, a boot-up sequence may include three main stages: a primary boot loader (PBL) stage, a boot stage, and a kernel stage. In some examples, the boot stage may also include multiple stages itself: a first secondary boot loader (SBL) stage—which may also be referred to as an SBL1 stage—and a second secondary SBL stage (which may also be referred to as an SBL2 stage). For an automotive device (e.g., that uses a Linux-based operating system), the boot-up sequence may include three main stages: a PBL stage, an extensible Boot Loader (XBL) stage, and a Unified Extensible Firmware Interface (UEFI) stage. After the boot-up sequence is completed, an initialization process (e.g., an "init" process) may be executed by the host system 105. The initialization system may be used to launch every other process run by the device.

In some examples, as part of the initialization procedure, the memory system 110 may rebuild metadata and/or L2P tables for the blocks in the memory devices 130—e.g., if the device including the system 100 experiences complete power loss. In such cases, the memory system 110 may prevent the host system 105 from accessing data stored in the memory system 110 until the metadata and/or L2P tables have been rebuilt.

A host system 105 may store code for executing the initialization sequence (which may be referred to as the "initialization code") in the memory system 110. In some examples, the initialization code may be stored in multiple-level cells of the memory device 130-a—e.g., in accordance with access commands received from the host system 105.

In some examples, a portion of the initialization code (e.g., the PBL code) is stored in single-level cells and the rest of the initialization code is stored in multiple-level cells. The host system 105 may also be configured to have a timeout duration for the initialization procedure, where the host system 105 may restart the initialization procedure ("reboot") if the timeout duration for the initialization procedure is exceeded. For different types of devices, the host system 105 may have different timeout durations. In some examples, the host system 105 may be configured to have different timeout durations for different portions of the initialization procedure, where the host system 105 may restart the initialization procedure if any one of the timeout durations for the initialization procedure is exceeded.

The amount of time taken to complete the initialization procedure may be related to a performance of the device, a user experience for the device, or both. For example, extended boot-up times may reduce a performance of a computing system (e.g., if another device in the computing system must wait until the device completes the boot-up sequence to begin its operations, if near instantaneous data from the device is desired), reduce a user experience (e.g., if the user must wait until the device completes the boot-up sequence to begin using the device), or both. In some examples, to meet a latency parameter of an initialization procedure for a certain type of device, the memory system 110 may be configured to include a memory device that is capable of meeting the latency parameter—e.g., a higher power memory device, an error-hardened memory device, etc.

As described herein, accessing data stored in multiple-level cells may take longer than accessing data stored in single-level cells. Also, an average duration and/or power for accessing data stored in multiple-level cells may be further increased based on or in response to additional error correction procedures being performed for multiple-level cells relative to single-level cells. In some examples, the increased access latency and/or power consumption associated with accessing multiple-level cells may cause an initialization procedure at the host system 105 to timeout or fail, and the host system 105 to reboot multiple times before a successful initialization procedure can be completed. In some examples, the host system 105 may become stuck in a reboot loop and be unable to successfully complete the initialization procedure.

To reduce a rate of initialization timeouts or failure, techniques for dynamically storing the initialization code in portions of a memory system (e.g., the memory system 110) that reduce the likelihood that a duration for accessing the initialization code will exceed a timeout duration, a power consumption for executing the initialization code will exceed a power threshold, or both, may be used. The techniques may include indicating, to the memory system, one or more timeout durations that are configured for an initialization procedure so that the memory system may determine where to store the initialization code within the memory system such that a likelihood of a timeout duration being exceeded will be reduced.

In some examples, the memory system 110 receives an indication of one or more timeout durations for an initialization sequence (e.g., a boot sequence) supported by the host system 105. The memory system 110 may store information for the initialization sequence in a set of (e.g., one or more) memory cells based on or in response to the indicated one or more timeout durations. For example, the set of memory cells used to store the initialization sequence may be selected so that the initialization sequence can be completed within the one or more timeout durations and/or within a power consumption threshold. Selecting the set of memory cells may include selecting memory cells that are associated with shorter access durations than other types of memory cells (e.g., SLCs), with a reduced likelihood of errors, and the like. Based on or in response to storing the initialization sequence, the memory system 110 may access the initialization sequence stored in the set of memory cells after initializing the initialization sequence—e.g., in response to a power-on signal.

By storing an initialization sequence in memory cells that are more likely to be accessed within the one or more timeout durations, a likelihood of an initialization sequence being repeated (or becoming stuck in a loop) may be reduced. Similarly, by storing an initialization sequence in memory cells that are more likely to be accessed within a power consumption threshold, a likelihood of an initialization sequence being repeated (or becoming stuck in a loop) may be reduced.

Figure 2:
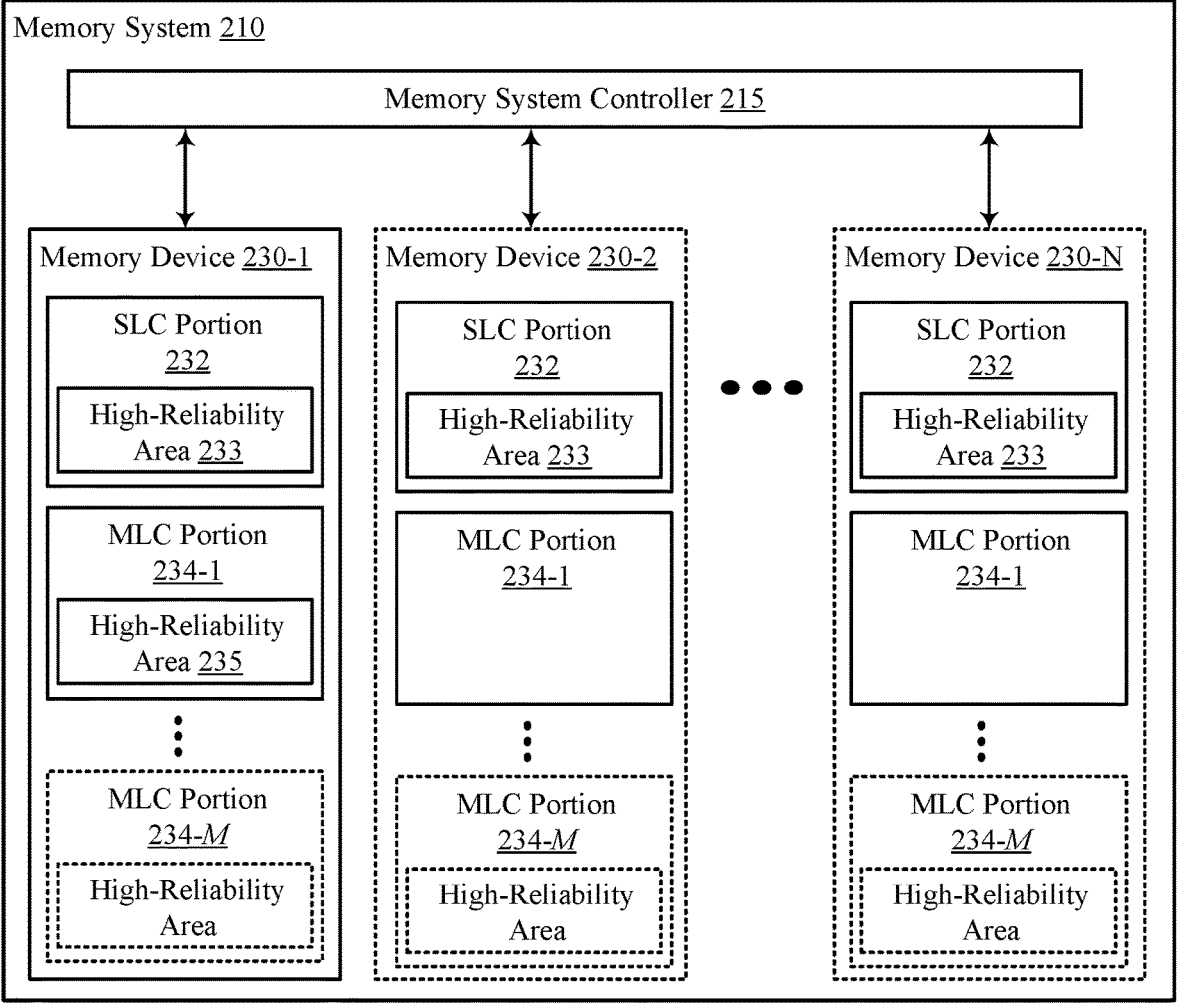
FIG. 2 illustrates an example of a subsystem that supports determining locations in NAND memory for boot-up code in accordance with examples as disclosed herein.

FIG. 2 shows an example of a subsystem that supports determining locations in NAND memory for boot-up code in accordance with examples as disclosed herein.

The subsystem 200 may include memory system 210, which may be an example of a memory system as described with reference to FIG. 1. The memory system 210 may include the memory system controller 215 and one or more memory devices (e.g., the first memory device 230-1 through the Nth memory device 230-N), which may be respective examples of a memory system controller and one or more memory devices as described with reference to FIG. 1.

The memory devices 230 may be configured to store data in one or more types of memory cells (e.g., SLCs, DLCs, TLCs, QLCs, etc.) across one or more portions of the memory devices 230. In some examples, certain types of memory cells in a memory device may be more reliable than other types of memory cells in the memory device. For example, an error rate associated with accessing SLCs in the memory device may be less than an error rate associated with accessing QLCs in the memory device. Certain types of memory cells in a memory device may also be accessed with less latency than other type of memory cells in the memory device. For example, an access latency of SLCs in the memory device may be less than an access latency of QLCs in the memory device.

Similarly, certain areas of a memory device (e.g., that encompass certain sets of memory cells) may be more reliable than other areas of a memory device (e.g., may be associated with a lower error rate). In some examples, a "set" of memory cells may include a single memory cell. An area of a memory device may be a section of the memory device, a memory bank, a portion of a memory bank, one or more planes, one or more blocks, one or more virtual blocks, one or more pages, etc. For example, memory cells (e.g., SLCs) in a central region of the memory device may be less prone to errors than memory cells (e.g., SLCs) on a periphery of the memory device. In some examples, the areas of the memory device that are more reliable may be associated with superior access lines than other areas of the memory device, less susceptible to temperature increases, less susceptible to interference, and the like. In some examples, the higher-reliability areas of the memory device may be determined based on modeling, identified during testing, or both.

In some examples, one of the memory devices 230 may be configured with one type of memory cells (e.g., SLCs) and other of the memory devices 230 may be configured with one or more types of memory cells (e.g., SLCs, DLCs, TLCs, QLCs, or any combination thereof).

The first memory device 230-1 may be configured with SLCs and one or more multiple-level cells (MLCs). The SLC portion 232 may be used to represent the SLCs included in the first memory device 230-1. The first MLC portion 234-1 may be used to represent a first type of multiple-level cells (e.g., QLCs), and the Mth MLC portion 234-M may be used to represent a second type of multiple-level cells (e.g., TLCs). The SLC portion 232 may include an SLC high-reliability area 233 that is associated with a reduced error rate relative to other SLC portions within the first memory device 230-1. Similarly, the first MLC portion 234-1 may include the MLC high-reliability area 235 that is associated with a reduced error rate relative to other MLC portions within the first memory device 230-1.

The other of the memory devices 230 (the second memory device 230-2 through the Nth memory device 230-N) may similarly include an SLC portion, one or more MLC portions, or any combination thereof. Additionally, the SLC or MLC portions included in the other of the memory devices 230 may include one or more high-reliability areas.

The memory system controller 215 may be configured to receive an indication of one or more timeout parameters for an initialization sequence used by a host system. The memory system controller 215 may be further configured to store, within one or more of the memory devices 230, initialization code for the initialization sequence in accordance with the received one or more timeout parameters— e.g., so that the initialization code (or each portion of the initialization code) can be executed within the one or more timeout parameters. In some examples, the memory system controller 215 is configured to store a first portion of the initialization code (e.g., corresponding to a PBL stage) in the SLC portion 232 or the SLC high-reliability area 233 of the SLC portion 232. The memory system controller 215 may be further configured to store a second portion of the initialization code in the first MLC portion 234-1 or the MLC high-reliability area 235 of the first MLC portion 234-1.

The memory system controller 215 may be configured to determine the high-reliability areas based on or in response to data stored (e.g., during a testing procedure and pre-deployment) in the memory system controller 215. For example, the data may indicate that the high-reliability areas are hardened against temperature variations—e.g., bit error rates for the high-reliability areas may increase less than a threshold amount (or not at all) with temperature increases. The data may similarly indicate that the high-reliability areas are hardened against interference. In some examples, the data may indicate that memory cells in the high-reliability areas have larger read windows than similarly configured memory cells in other areas of a memory device.

In some examples, the memory system controller 215 may be configured to determine the high-reliability areas based on or in response to data measured during operation. For example, the memory system controller 215 may be configured to keep track of bit error rates for different areas of a memory device—e.g., with respect to current operating conditions, such as temperature, battery life, power consumption, etc. In some examples, over time, the memory system controller 215 may remove a distinction of an area as a high-reliability area—e.g., if the current error rate of the previously indicated high-reliability area is determined to exceed a threshold value. After removing the high-reliability distinction from the area, the memory system controller 215 may be configured to move data stored in the area (e.g., a portion of an initialization code) to a still high-reliability area of the memory.

Figure 3:
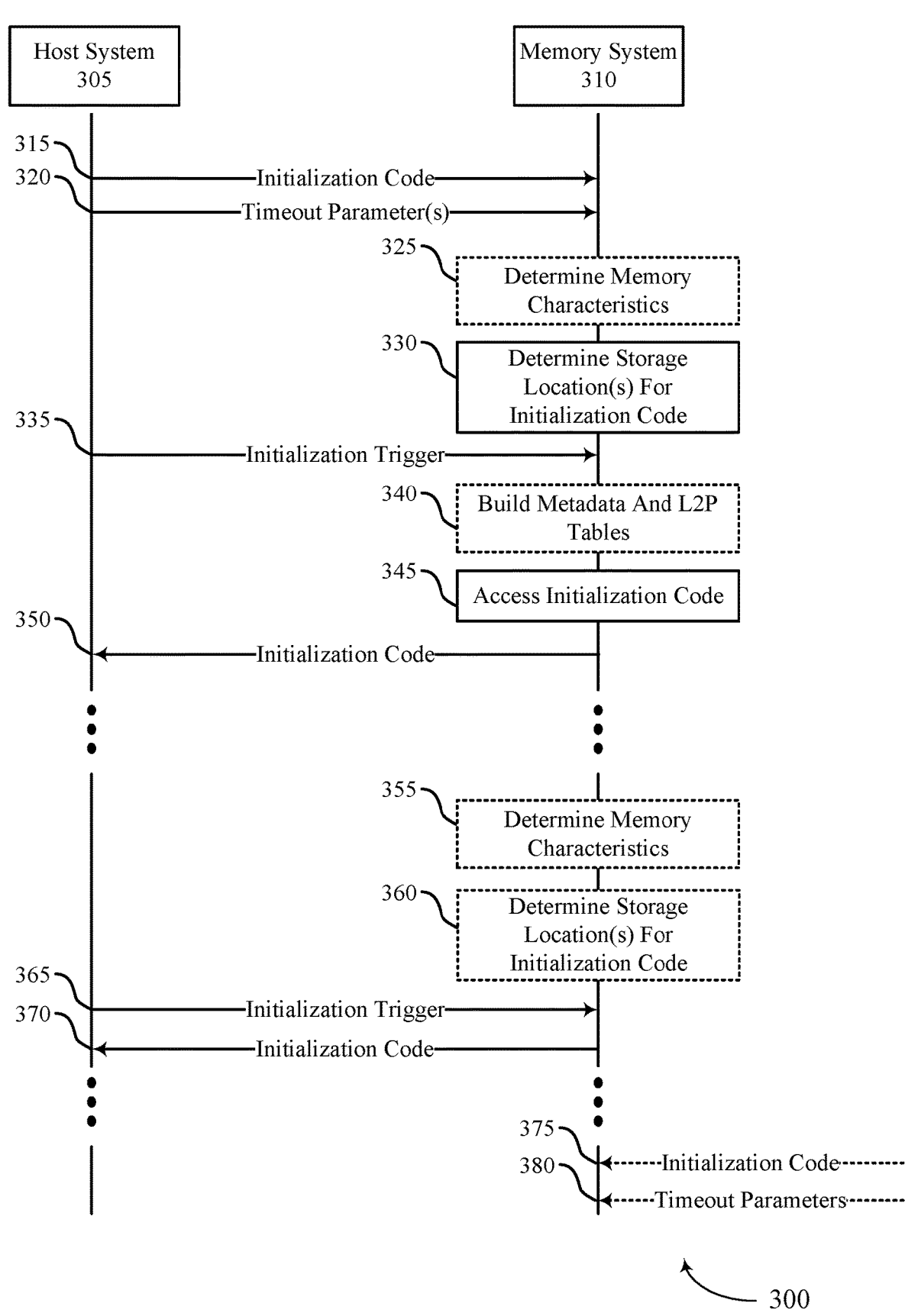
FIG. 3 illustrates an example of a set of operations that supports determining locations in NAND memory for boot-up code in accordance with examples as disclosed herein.

FIG. 3 illustrates an example of a set of operations that supports determining locations in NAND memory for boot-up code in accordance with examples as disclosed herein.

The process flow 300 may be performed by the host system 305 and the memory system 310, which may be respective examples of a host system and a memory system described herein. In some examples, the process flow 300 shows an example set of operations performed to support determining locations in NAND memory for boot-up code. For example, the process flow 300 may include operations for storing an initialization procedure within the memory system 310 based on or in response to one or more timeout indications received for one or more portions of the initialization procedure.

Aspects of the process flow 300 may be implemented by a controller, among other components. Additionally, or alternatively, aspects of the process flow 300 may be implemented as instructions stored in memory (e.g., firmware stored in a memory coupled with a controller). For example, the instructions, when executed by a controller, may cause the controller to perform the operations of the process flow 300.

One or more of the operations described in the process flow 300 may be performed earlier or later, omitted, replaced, supplemented, or combined with another operation. Also, additional operations described herein may replace, supplement, or be combined with one or more of the operations described in the process flow 300.

Figure 4:
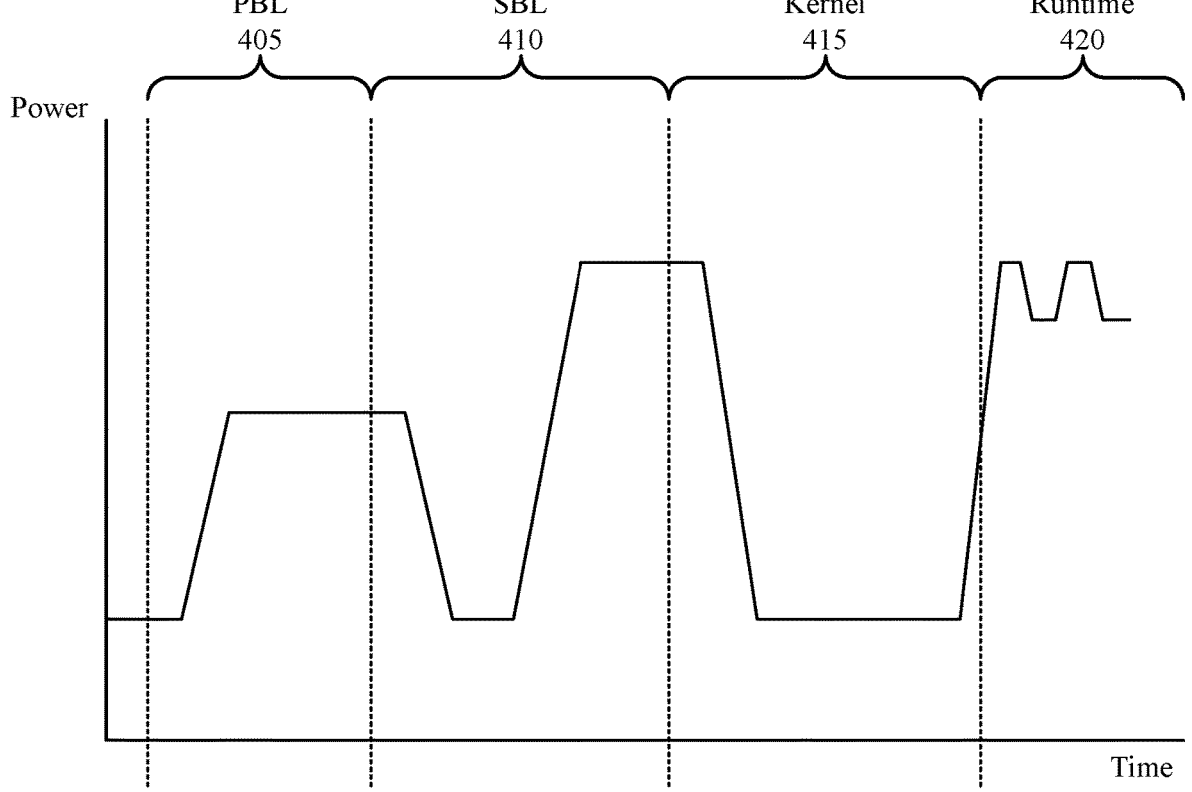
FIG. 4 illustrates an example of a timing diagram that supports determining locations in NAND memory for boot-up code in accordance with examples as disclosed herein.

At 315, initialization code for an initialization procedure may be received (e.g., from the host system 305) at the memory system 310. The initialization code may include instructions for initializing the operation of a device that includes the host system 305 and the memory system 310. For example, the initialization code may include code for a PBL stage, one or more SBLs, an XBL stage, a kernel stage, a runtime stage (e.g., for an operating system), or any combination thereof. The timing diagram 400 of FIG. 4 depicts an example initialization sequence that includes a PBL stage, an SBL stage, a kernel stage, and a runtime stage. The initialization code may include an indication of which portions of the initialization code correspond to which stages of the initialization code.

At 320, an indication of one or more timeout parameters for the initialization procedure may be received (e.g., from the host system 305) at the memory system 310. The one or more timeout parameters may include a timeout duration for completing the entire initialization procedure. A timeout duration for completing a PBL stage of the initialization procedure. A timeout duration for completing an SBL stage of the initialization procedure. And so on. In some examples, if any one of the timeout durations are exceeded, the host system 305 may restart the initialization procedure from the beginning. In some examples, the timeout parameters indicated by the host system 305 are based on or in response to an application for the host system 305. For example, if the host system 305 is configured to support the operation of a mobile device, the timeout parameters may be less stringent than if the host system 305 is configured to support the operation of an automotive device.

In some example, the host system 305 may further indicate one or more power consumption parameters for the initialization procedure. The one or more power consumption parameters may include a power threshold for completing the entire initialization procedure. A power threshold for completing a PBL stage of the initialization procedure. A power threshold for completing an SBL stage of the initialization procedure. And so on. The one or more power consumption thresholds may be based on an application of a device that includes the host system 305 and the memory system 310, characteristics of a battery coupled with the host system 305 and the memory system 310, or both.

At 325, memory characteristics of one or more memory devices in the memory system 310 may be determined (e.g., by the memory system 310). In some examples, the memory characteristics of the one or more memory devices may indicate a type of memory cells included in the one or more memory devices (e.g., SLCs, DLCs, TLCs, QLCs, or a combination thereof). Additionally, or alternatively, the memory characteristics may indicate error rates measured for different areas of the one or more memory devices. In some examples, a set of error rates is indicated for the different areas. For example, the set of error rates may include one or more error rates for one or more temperature ranges, one or more error rates for different levels of interference, one or more error rates for different battery levels, etc. Additionally, or alternatively, the memory characteristics may indicate properties of access lines used to access corresponding areas of the one or more memory devices. For examples, memory characteristics may indicate resistance and capacitance metrics for the access lines. Additionally, or alternatively, the memory characteristics may indicate sensing windows (e.g., an average sensing window) of the memory cells in corresponding areas of the one or more memory devices. Additionally, or alternatively, the memory characteristics may indicate the power consumption of the memory cells in corresponding areas of the one or more memory devices.

Alone, or in combination, these characteristics may indicate a reliability and/or power consumption of different areas in the one or more memory devices. For example, high-reliability areas of the one or more memory devices may be identified based on or in response to having a lower-order type of memory cells in the area (e.g., SLCs), having error rates that remain below a threshold across one or more metrics, having access lines with resistance and capacitance levels that are below a threshold, having sensing windows that are above a threshold, or any combination thereof. The areas of the one or more memory devices may correspond to physical regions of the memory devices, sections of the memory devices, one or more memory banks of the memory devices, sets of memory cells within a memory bank, and the like.

In some examples, the memory characteristics are stored in the memory system 310 (e.g. pre-deployment), and the memory system determines the memory characteristics based on or in response to reading memory locations storing the memory characteristics. Additionally, or alternatively, the memory system 310 may determine one or more of the memory characteristics based on or in response to measurements taken during operation. For example, the memory system 310 may monitor an error rate of different areas of the one or more memory devices. Additionally, or alternatively, the memory system 310 may monitor a power consumption of the different areas of the one or more memory devices. Thus, the memory characteristics of the one or more memory devices may change over time.

In some examples, the host system 305 may be used to monitor an error rate and/or power consumption of the areas of the memory system 310 and may send (e.g., periodically) an indication of the error rates and/or power consumption to the memory system 310.

At 330, the locations within the memory system 310 for storing the initialization code may be determined (e.g., by the memory system 310). The storage locations may be determined based on or in response to the memory characteristics determined for the memory system 310 and the indicated timeout parameters. For example, the memory system 310 may store a PBL stage of the initialization code in an area of a memory device that includes SLCs based on or in response to a timeout duration for the PBL stage being below a first threshold duration. In some examples, the memory system 310 may store the PBL stage of the initialization code in an area of the memory device that includes SLCs identified as high-reliability based on or in response to the timeout duration for the PBL stage being below a second threshold duration that is less than the first threshold duration. The memory system 310 may store the PBL stage in the SLCs based on or in response to a duration of an access operation for the SLCs being less than a duration of an access operation for higher-order memory cells. Additionally, or alternatively, the memory system 310 may store the PBL stage in the SLCs based on or in response to an error rate for accessing the SLCs being less than an error rate for accessing higher-order memory cells.

In some examples, the memory system 310 may store the remaining one or more portions of the initialization code in standard-reliability and higher-order memory cells, such as standard reliability QLCs—e.g., based on or in response to the one or more timeout parameters for the remaining one or more portions of the initialization code exceeding one or more threshold durations. By storing the remaining one or more portions of the initialization code in the standard-reliability and higher-order memory cells, the storage efficiency for the remaining one or more portions of the initialization code may be increased while the timeout restrictions may be met. Alternatively, the memory system 310 may store the remaining one or more portions of the initialization code in high-reliability and/or lower-order memory cells, such as high-reliability DLCs—e.g., based on or in response to the one or more timeout parameters for the remaining one or more portions of the initialization code being less than the one or more threshold durations. By storing the remaining one or more portions in the high-reliability and/or lower-order memory cells, the storage efficiency for the remaining one or more portions of the initialization code may decrease but a likelihood of meeting the stricter timeout restrictions may be increased.

In some examples, a second portion of the initialization code is stored in a second set of memory cells for executing the second portion of the initialization code within a timeout duration indicated for the second portion of the initialization code (e.g., standard-reliability SLCs). And a third portion of the initialization code is stored in a third set of memory cells for executing the third portion of the initialization code within a timeout duration indicated for the third portion of the initialization code (e.g., high-reliability QLCs).

Additionally, or alternatively, the memory system 310 may store the one or more portions of the initialization code in low-power memory cells that are identified as having power consumption metrics that are less than a power threshold. In some examples, the memory system 310 may store the one or more portions of the initialization code in standard-reliability, low-power memory cells (e.g., instead of high-reliability, standard-power memory cells) based on or in response to the application of the device—e.g., if the device is a mobile device. By storing the one or more portions of the initialization code in standard-reliability, low-power memory cells, an operating battery range for a device may be increased. Alternatively, the memory system 310 may store the one or more portions of the initialization code in high-reliability, low-power memory cells based on or in response to the application of the device. In such cases, the operating battery range for a device may be further increased—e.g., by reducing a likelihood of power-intensive error correction procedures.

Additionally, or alternatively, the memory system 310 may store the one or more portions of the initialization code in memory cells that are temperature-hardened—e.g., that exhibit error rates below a threshold across a temperature range. The memory system 310 may use temperature-hardened memory cells based on or in response to measuring a temperature (e.g., an average temperature) of the memory system 310 during operation. Similarly, the memory system 310 may store the one or more portions of the initialization code in memory cells that are interference-hardened—e.g., that exhibit error rates below a threshold across an interference range. The memory system 310 may use interference-hardened memory cells based on or in response to measuring interference (e.g., an average interference) to the memory system 310 during operation. By storing the one or more portions of the initialization code in the memory device based on or in response to an environment experienced by the memory system 310, the memory system 310 may implement measures to reduce a likelihood of errors when accessing the initialization code that are specific to the environment experienced by the memory system 310.

At 335, a trigger for an initialization procedure may be received at the memory system 310. The trigger for the initialization procedure may include a signal for powering on the device, a signal for resetting the device, or the like.

At 340, metadata and/or L2P tables may be built at the memory system 310—e.g., if the initialization trigger is received for a first time. In some examples, the metadata and/or L2P table may be rebuilt at the memory system 310—e.g., if the initialization trigger is received after an extended period of a battery of the device being drained. In some examples, the host system 305 may be prevented from accessing data stored in the memory system (e.g., including initialization code) until the metadata and/or L2P tables have been built or rebuilt.

In some examples, one or more timeout durations for executing the initialization procedure may be exceeded based on or in response to the metadata and/or L2P tables being built or rebuilt during the initialization procedure, and the host system 305 may therefore restart the initialization procedure—e.g., before the memory system 310 completes building or rebuilding of the metadata and/or L2P tables. To avoid becoming stuck in a reboot loop, the memory system 310 may save aspects of the metadata and/or L2P tables that are partially or fully built or rebuilt during the prior initialization procedure—e.g., at one or more checkpoints. Accordingly, upon receiving the subsequent initialization trigger, the memory system 310 may resume the procedure for building or rebuilding the metadata and/or L2P tables from a checkpoint (e.g., a latest checkpoint) established during the initialization procedure.

Similarly, an error correction procedure may be performed at the memory system—e.g., to correct an error in a portion of the initialization code retrieved from a memory device. In some examples, one or more timeout durations for executing the initialization procedure may be exceeded based on or in response to the error correction procedure being performed during the initialization procedure. To avoid becoming stuck in a reboot loop, the memory system 310 may save operations of the error correction procedure that are completed during the prior initialization procedure—e.g., at one or more checkpoints. Accordingly, upon receiving the subsequent initialization trigger, the memory system 310 may resume the error correction procedure from a checkpoint (e.g., a latest checkpoint) established during the prior initialization procedure.

At 345, the one or more portions of the initialization code may be accessed at the one or more storage locations at the memory system 310 used to store the one or more portions of the initialization code. Accessing the one or more portions of the initialization code may include determining logic states of the memory cells used to store the initialization code. In some examples, accessing the one or more portions of the initialization code includes performing error correction procedures for the data read from the memory cells. As described herein, a likelihood of error correction procedures being performed may be reduced based on or in response to the one or more portions of the initialization code being stored in high-reliability memory cells (e.g., SLCs, high-reliability SLCs, high-reliability QLCs, etc.).

At 350, the one or more portions of the initialization code may be received (e.g., from the memory system 310) at the host system 305 based on or in response to accessing the initialization code. The host system 305 may execute the initialization code, resulting in a runtime process (e.g., an "init" process for an operating system) being instantiated. If a timeout duration for executing one or more portions of the initialization procedure is exceeded, the host system 305 may be configured to send a second initialization trigger to the memory system 310 to restart the initialization procedure from the beginning of the initialization procedure or the beginning of portion of the initialization procedure corresponding to the timeout.

At 355, the memory characteristics of the one or more memory devices in the memory system 310 may be determined (e.g., by the memory system 310). In some examples, the memory characteristics of the one or more memory devices may change throughout an operating life of the memory system. Accordingly, the memory characteristics of the areas of the one or more memory devices may change. In some examples, an area of a memory device previously identified as a high-reliability area may be identified as a standard-reliability area—e.g., if an error rate of the area has increased above a threshold. The memory system 310 may determine that a previously identified high-reliability area that stores one or more portion of the initialization code is no longer a high-reliability area.

At 360, storage locations for the initialization code may be determined based on or in response to determining that one or more areas of the memory device used to store one or more portions of the initialization code has transitioned from a high-reliability state to a normal-reliability state. The memory system 310 may relocate the one or more portions of the initialization code to one or more areas of the memory device (or to another memory device) that are currently identified as high-reliability areas. By relocating the one or more portions of the initialization code to currently identified high-reliability areas, the memory system 310 may reduce a likelihood of an error occurring when the one or more portions of the initialization code are accessed (relative to maintaining the current location of the one or more portions of the initialization code). Additionally, by relocating the one or more portions of the initialization code to higher-reliability areas, an operating life of the memory system 310 may be increased—e.g., because the memory system 310 may continue to be used to meet the timeout restrictions of the host system 305 as portions of the memory system 310 degrade.

At 365, a second initialization trigger may be received (e.g., from the host system 305) at the memory system 310. The second initialization trigger may be configured similarly as the prior initialization trigger described with reference to 335.

At 370, the initialization code may be received (e.g., from the memory system 310) at the host system 305 as similarly described with reference to 350.

At 375, a different initialization code may be received (e.g., from a different host system) at the memory system 310. For example, the memory system 310 may be relocated to a different device that includes the different host system.

At 380, one or more second timeout parameters for the different initialization code may be received (e.g., from the different host system) at the memory system 310. The different device may have a different timing restriction than the device that includes the host system 305. For example, the one or more second timeout parameters may be associated with shorter durations than the one or more timeout parameters received from the host system 305.

As described herein, including with reference to the operations described at 325 through 345, the memory system 310 may determine a location for storing one or more portions of the different initialization code within the memory system 310 based on or in response to current characteristics of the one or more memory devices within the memory system 310 and the one or more second timeout parameters. That is, the memory system 310 may store the one or more portions of the different initialization code in areas of the memory system 310 such that a likelihood of a timeout duration indicated by the one or more second timeout parameters being exceeded. In some examples, the memory system 310 may store the one or more portions of the different initialization code in different areas of the memory system 310 than the first initialization code based on or in response to the memory characteristics of the one or more memory devices being different, the timeout parameters being different, or both.

By differently storing initialization codes for different devices, a same memory system (e.g., the memory system 310) may be capable of being used for different types of devices that have different timing restrictions. By contrast, a memory system that does not take into consideration the timing requirements of different device when storing the initialization code for the different devices may be incompatible with devices that have stricter timeout requirements—e.g., if the memory system is configured to store at least a portion of initialization code in standard-reliability and higher-order cells, such as standard-reliability QLCs, regardless of the device type.

FIG. 4 illustrates an example of a timing diagram that supports determining locations in NAND memory for boot-up code in accordance with examples as disclosed herein.

The timing diagram 400 depicts aspects of an initialization sequence executed by a host system—e.g., after a power-on event, or after a reset event, etc. The initialization sequence may include a primary boot loader portion 405, a secondary boot loader portion 410, a kernel portion 415, and a runtime portion 420. A memory system may store the initialization code for executing the initialization sequence.

During the primary boot loader portion 405, the memory system may access memory cells in a memory device used to store the PBL code and provide the PBL code to the host system. Based on or in response to executing the PBL code, the code for executing the secondary boot loader portion 410 may be loaded into internal random-access memory. In some examples, the secondary boot loader portion 410 may include a first stage and a second stage, where the first stage may be used to load the second stage into an external random-access memory, and the second stage may be used to set up a file system, low-level memory protection, and the like. In some examples, the secondary boot loader portion 410 may be or include an extensible boot loader stage.

Based on or in response to executing the secondary boot loader portion 410, code (e.g., an operating system kernel) for executing the kernel portion 415 may be loaded into the external RAM and executed by the host system. Based on or in response to executing the kernel portion 415, memory management and caches may be initialized and an "init" process may be identified and launched. Based on or in response to launching the "init" process, the runtime portion 420 of operation may be entered, where the "init" process may be used to launch other processes for the system.

In some examples, the power consumption of the system varies during the different portions of the initialization sequence. For example, the power consumed during the primary boot loader portion 405 may be less than the power consumed during the secondary boot loader portion 410. In some examples, the power consumption during the initialization sequence may be maintained below a threshold—e.g., to prevent an initialization sequence from resetting if the device is powered on with a low battery.

Figure 5:
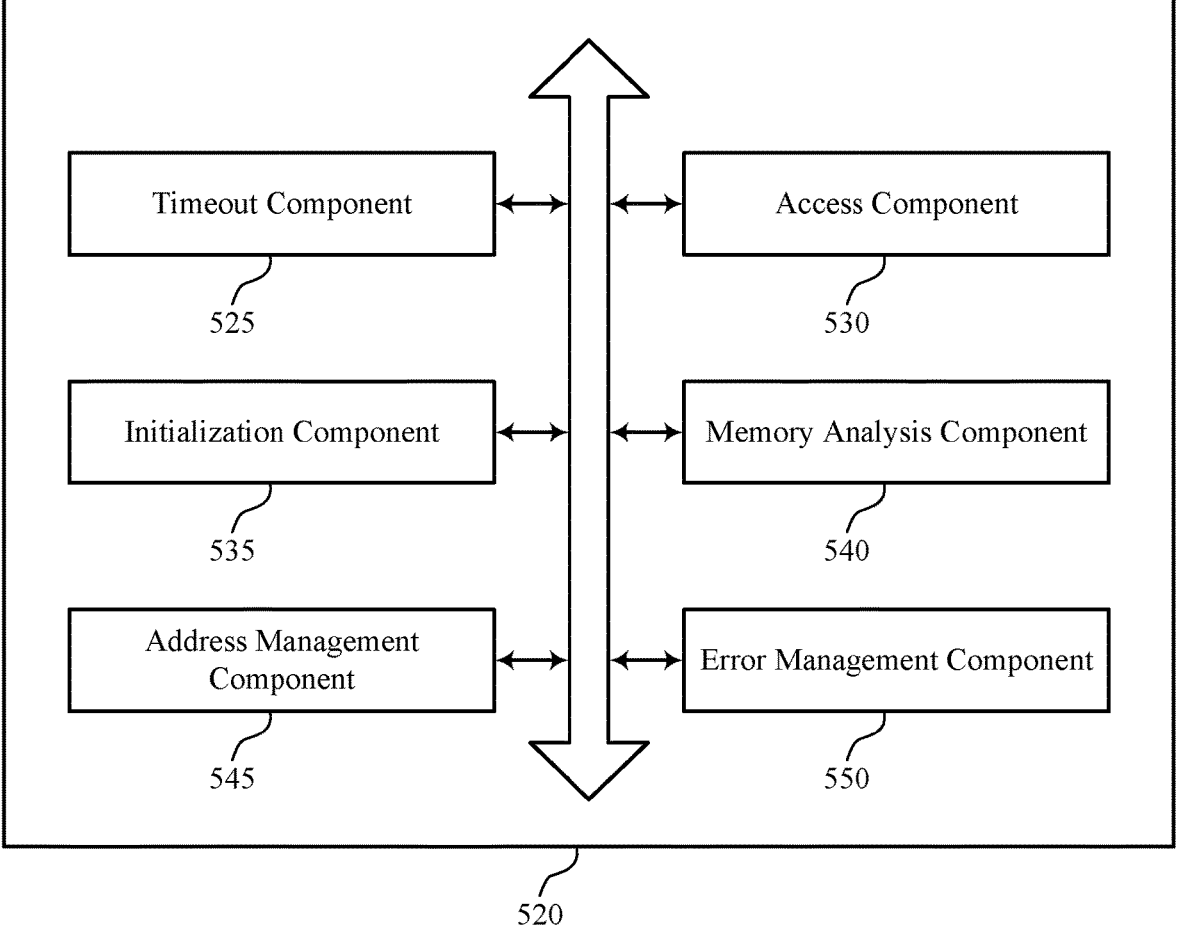
FIG. 5 shows a block diagram of a memory system that supports determining locations in NAND memory for boot-up code in accordance with examples as disclosed herein.

FIG. 5 shows a block diagram 500 of a memory system 520 that supports determining locations in NAND memory for boot-up code in accordance with examples as disclosed herein. The memory system 520 may be an example of aspects of a memory system as described with reference to FIGS. 1 through 4. The memory system 520, or various components thereof, may be an example of means for performing various aspects of determining locations in NAND memory for boot-up code as described herein. For example, the memory system 520 may include a timeout component 525, an access component 530, an initialization component 535, a memory analysis component 540, an address management component 545, an error management component 550, or any combination thereof. Each of these components may communicate, directly or indirectly, with one another (e.g., via one or more buses).

The timeout component 525 may be configured as or otherwise support a means for receiving an indication of a timeout duration for a boot sequence of a host system. The access component 530 may be configured as or otherwise support a means for storing information for the boot sequence in a set of memory cells based at least in part on the timeout duration. The initialization component 535 may be configured as or otherwise support a means for accessing the information for the boot sequence that is stored in the set of memory cells based at least in part on an initialization of the boot sequence.

In some examples, the initialization component 535 may be configured as or otherwise support a means for selecting, based at least in part on the timeout duration, the set of memory cells based at least in part on the set of memory cells being associated with a read latency that is less than a latency threshold, with an error rate that is less than an error threshold, with a quantity of data levels that is less than a data level threshold, or any combination thereof, where the information for the boot sequence is stored in the set of memory cells based at least in part on the set of memory cells being selected.

In some examples, the initialization component 535 may be configured as or otherwise support a means for determining the read latency, the error rate, or both, based at least in part on a temperature of the set of memory cells, where the set of memory cells are selected based at least in part on determining the read latency, the error rate, or both.

In some examples, the initialization component 535 may be configured as or otherwise support a means for determining the latency threshold, the error threshold, the data level threshold, or any combination thereof, based at least in part on the timeout duration, where the set of memory cells are selected based at least in part on the latency threshold, the error threshold, the data level threshold, or any combination thereof.

In some examples, to support determining the latency threshold, the initialization component 535 may be configured as or otherwise support a means for determining average times for completing the boot sequence based at least in part on combinations of the read latency, the error rate, or the quantity of data levels determined for the set of memory cells. In some examples, to support determining the latency threshold, the initialization component 535 may be configured as or otherwise support a means for selecting, based at least in part on the average times for completing the boot sequence, a combination of the latency threshold, the error threshold, the data level threshold, or any combination thereof, that corresponds to an average time of the average times that is less than the timeout duration.

In some examples, the memory analysis component 540 may be configured as or otherwise support a means for determining an expected error rate for the set of memory cells based at least in part on a measured error rate for the set of memory cells, properties of a set of access lines corresponding to the set of memory cells, a sensing window of the set of memory cells, or any combination thereof. In some examples, the initialization component 535 may be configured as or otherwise support a means for selecting the set of memory cells based at least in part on the expected error rate of the set of memory cells being less than an error threshold, where the information for the boot sequence is stored in the set of memory cells based at least in part on the set of memory cells being selected.

In some examples, the memory analysis component 540 may be configured as or otherwise support a means for determining a quantity of bits configured to be output by respective memory cells of the set of memory cells. In some examples, the initialization component 535 may be configured as or otherwise support a means for selecting the set of memory cells based at least in part on the quantity of bits being less than a data level threshold, where the information for the boot sequence is stored in the set of memory cells based at least in part on the set of memory cells being selected.

In some examples, the memory analysis component 540 may be configured as or otherwise support a means for determining a read latency for respective memory cells of the set of memory cells. In some examples, the initialization component 535 may be configured as or otherwise support a means for selecting the set of memory cells based at least in part on the read latency being less than a latency threshold, where the information for the boot sequence is stored in the set of memory cells based at least in part on the set of memory cells being selected.

In some examples, the timeout duration is for a first portion of the boot sequence, the indication further includes a second indication of a second timeout duration for a second portion of the boot sequence, and the information stored in the set of memory cells is for the first portion of the boot sequence that precedes the second portion of the boot sequence.

In some examples, the access component 530 may be configured as or otherwise support a means for storing second information associated with the second portion of the boot sequence in a second set of memory cells based at least in part on the second timeout duration. In some examples, the initialization component 535 may be configured as or otherwise support a means for accessing the second information stored in the second set of memory cells during the second portion of the boot sequence.

In some examples, the initialization component 535 may be configured as or otherwise support a means for selecting, based at least in part on the timeout duration, the set of memory cells based at least in part on the set of memory cells being associated with a read latency that is less than a latency threshold, an error rate that is less than an error threshold, a quantity of data levels that is less than a data level threshold, or any combination thereof. In some examples, the initialization component 535 may be configured as or otherwise support a means for selecting, based at least in part on the second timeout duration, the second set of memory cells based at least in part on the second set of memory cells being associated with a second read latency that is greater than or equal to the latency threshold, a second error rate that is greater than or equal to the error threshold, a second quantity of data levels that is greater than or equal to the data level threshold, or any combination thereof, where the second information for the boot sequence is stored in the second set of memory cells based at least in part on the second set of memory cells being selected.

In some examples, the timeout component 525 may be configured as or otherwise support a means for receiving, subsequent to accessing the information for the boot sequence, a second indication of a second timeout duration for the boot sequence of the host system. In some examples, the access component 530 may be configured as or otherwise support a means for storing the information for the boot sequence in a second set of memory cells based at least in part on the second timeout duration. In some examples, the initialization component 535 may be configured as or otherwise support a means for accessing, after storing the information for the boot sequence in the second set of memory cells, the information stored in the second set of memory cells based at least in part on a subsequent initialization of the boot sequence.

In some examples, the timeout component 525 may be configured as or otherwise support a means for receiving a second indication of a second timeout duration for a second boot sequence of a second host system. In some examples, the access component 530 may be configured as or otherwise support a means for storing second information associated with the second boot sequence in a second set of memory cells based at least in part on the second timeout duration. In some examples, the initialization component 535 may be configured as or otherwise support a means for access the second information stored in the second set of memory cells based at least in part on an initialization of the second boot sequence.

In some examples, the address management component 545 may be configured as or otherwise support a means for performing a procedure for building a table associated with accessing a memory device based at least in part on the initialization of the boot sequence. In some examples, the initialization component 535 may be configured as or otherwise support a means for storing one or more checkpoints associated with building the table during the initialization of the boot sequence.

In some examples, the initialization component 535 may be configured as or otherwise support a means for receiving a command to perform a reinitialization of the boot sequence. In some examples, the address management component 545 may be configured as or otherwise support a means for resuming the procedure for building the table from a latest checkpoint of the one or more checkpoints based at least in part on the reinitialization of the boot sequence.

In some examples, the error management component 550 may be configured as or otherwise support a means for performing an error correction procedure for the information accessed during the initialization of the boot sequence. In some examples, the initialization component 535 may be configured as or otherwise support a means for storing one or more checkpoints associated with performing the error correction procedure. In some examples, the initialization component 535 may be configured as or otherwise support a means for receiving a command to perform a reinitialization of the boot sequence. In some examples, the error management component 550 may be configured as or otherwise support a means for resuming the error correction procedure from a latest checkpoint of the one or more checkpoints based at least in part on the reinitialization of the boot sequence.

Figure 6:
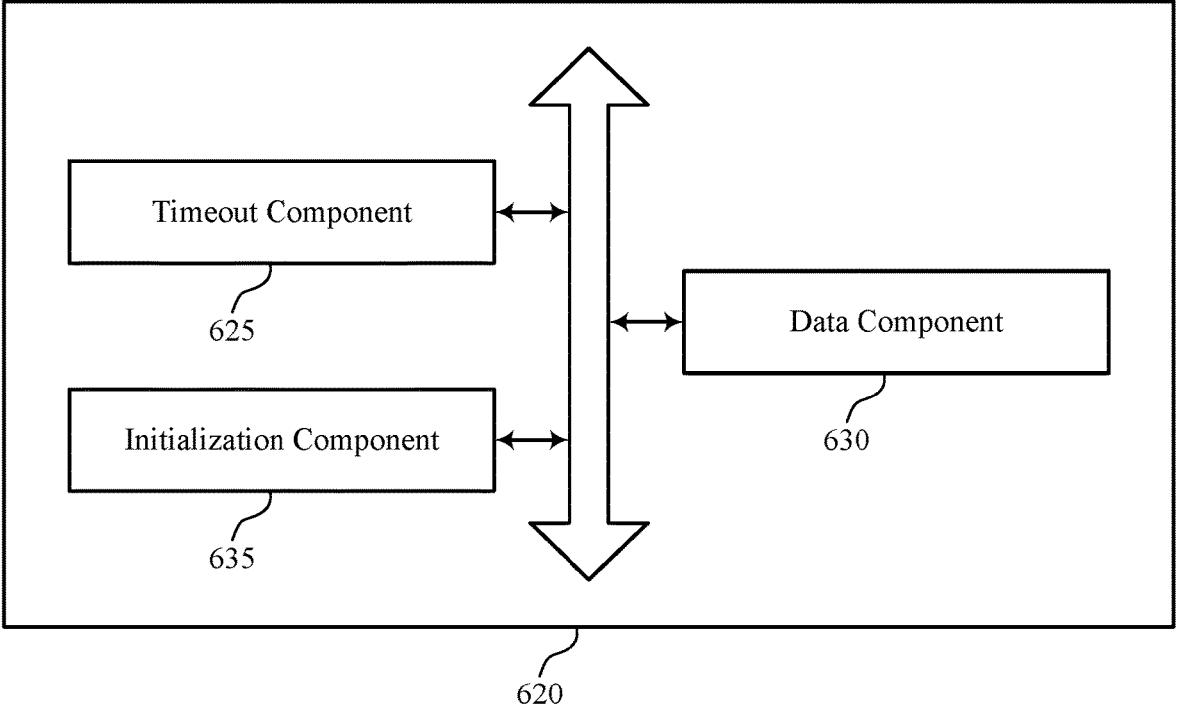
FIG. 6 shows a block diagram of a host system that supports determining locations in NAND memory for boot-up code in accordance with examples as disclosed herein.

FIG. 6 shows a block diagram 600 of a host system 620 that supports determining locations in NAND memory for boot-up code in accordance with examples as disclosed herein. The host system 620 may be an example of aspects of a host system as described with reference to FIGS. 1 through 4. The host system 620, or various components thereof, may be an example of means for performing various aspects of determining locations in NAND memory for boot-up code as described herein. For example, the host system 620 may include a timeout component 625, a data component 630, an initialization component 635, or any combination thereof. Each of these components may communicate, directly or indirectly, with one another (e.g., via one or more buses).

The timeout component 625 may be configured as or otherwise support a means for setting a timeout duration for a boot sequence of a host system. The data component 630 may be configured as or otherwise support a means for transmitting, to a memory device, an indication of the timeout duration for the boot sequence. The initialization component 635 may be configured as or otherwise support a means for initializing the boot sequence to access a set of memory cells of the memory device that store information for the boot sequence based at least in part on the timeout duration.

In some examples, the timeout component 625 may be configured as or otherwise support a means for determining the timeout duration for the boot sequence based at least in part on an operating age of the memory device, an average error rate of the memory device, a temperature of the memory device, a power setting of the memory device, or any combination thereof, where setting the timeout duration for the boot sequence is based at least in part on determining the timeout duration for the boot sequence.

In some examples, the timeout component 625 may be configured as or otherwise support a means for setting a second timeout duration for the boot sequence of the host system based at least in part on an increase in an operating age of the memory device above an age threshold, an increase in an average error rate of the memory device above an error threshold, an increase in a temperature of the memory device above a temperature threshold, modifying a power setting for the memory device, or any combination thereof.

Figure 7:
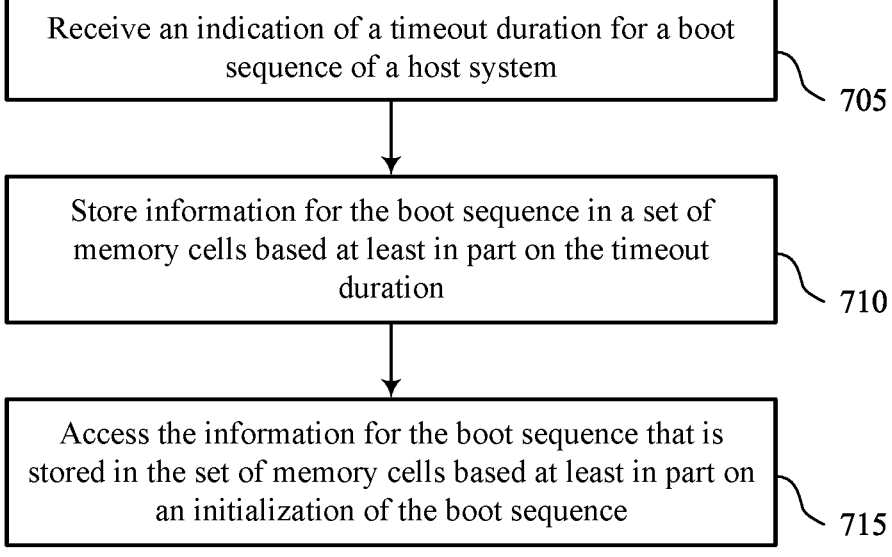
FIGS. 7 and 8 show flowcharts illustrating a method or methods that support determining locations in NAND memory for boot-up code in accordance with examples as disclosed herein.

FIG. 7 shows a flowchart illustrating a method 700 that supports determining locations in NAND memory for boot-up code in accordance with examples as disclosed herein. The operations of method 700 may be implemented by a memory system or its components as described herein. For example, the operations of method 700 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 705, the method may include receiving an indication of a timeout duration for a boot sequence of a host system. The operations of 705 may be performed in accordance with examples as disclosed herein. In some examples, aspects of the operations of 705 may be performed by a timeout component 525 as described with reference to FIG. 5.

At 710, the method may include storing information for the boot sequence in a set of memory cells based at least in part on the timeout duration. The operations of 710 may be performed in accordance with examples as disclosed herein. In some examples, aspects of the operations of 710 may be performed by an access component 530 as described with reference to FIG. 5.

At 715, the method may include accessing the information for the boot sequence that is stored in the set of memory cells based at least in part on an initialization of the boot sequence. The operations of 715 may be performed in accordance with examples as disclosed herein. In some examples, aspects of the operations of 715 may be performed by an initialization component 535 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving an indication of a timeout duration for a boot sequence of a host system; storing information for the boot sequence in a set of memory cells based at least in part on the timeout duration; and accessing the information for the boot sequence that is stored in the set of memory cells based at least in part on an initialization of the boot sequence.

Aspect 2: The method, apparatus, or non-transitory computer-readable medium of aspect 1, further including operations, features, circuitry, logic, means, or instructions, or any combination thereof for selecting, based at least in part on the timeout duration, the set of memory cells based at least in part on the set of memory cells being associated with a read latency that is less than a latency threshold, with an error rate that is less than an error threshold, with a quantity of data levels that is less than a data level threshold, or any combination thereof, where the information for the boot sequence is stored in the set of memory cells based at least in part on the set of memory cells being selected.

Aspect 3: The method, apparatus, or non-transitory computer-readable medium of aspect 2, further including operations, features, circuitry, logic, means, or instructions, or any combination thereof for determining the read latency, the error rate, or both, based at least in part on a temperature of the set of memory cells, where the set of memory cells are selected based at least in part on determining the read latency, the error rate, or both.

Aspect 4: The method, apparatus, or non-transitory computer-readable medium of any of aspects 2 through 3, further including operations, features, circuitry, logic, means, or instructions, or any combination thereof for determining the latency threshold, the error threshold, the data level threshold, or any combination thereof, based at least in part on the timeout duration, where the set of memory cells are selected based at least in part on the latency threshold, the error threshold, the data level threshold, or any combination thereof.

Aspect 5: The method, apparatus, or non-transitory computer-readable medium of aspect 4 where determining the latency threshold includes operations, features, circuitry, logic, means, or instructions, or any combination thereof for determining average times for completing the boot sequence based at least in part on combinations of the read latency, the error rate, or the quantity of data levels determined for the set of memory cells and selecting, based at least in part on the average times for completing the boot sequence, a combination of the latency threshold, the error threshold, the data level threshold, or any combination thereof, that corresponds to an average time of the average times that is less than the timeout duration.

Aspect 6: The method, apparatus, or non-transitory computer-readable medium of any of aspects 1 through 5, further including operations, features, circuitry, logic, means, or instructions, or any combination thereof for determining an expected error rate for the set of memory cells based at least in part on a measured error rate for the set of memory cells, properties of a set of access lines corresponding to the set of memory cells, a sensing window of the set of memory cells, or any combination thereof and selecting the set of memory cells based at least in part on the expected error rate of the set of memory cells being less than an error threshold, where the information for the boot sequence is stored in the set of memory cells based at least in part on the set of memory cells being selected.

Aspect 7: The method, apparatus, or non-transitory computer-readable medium of any of aspects 1 through 6, further including operations, features, circuitry, logic, means, or instructions, or any combination thereof for determining a quantity of bits configured to be output by respective memory cells of the set of memory cells and selecting the set of memory cells based at least in part on the quantity of bits being less than a data level threshold, where the information for the boot sequence is stored in the set of memory cells based at least in part on the set of memory cells being selected.

Aspect 8: The method, apparatus, or non-transitory computer-readable medium of any of aspects 1 through 7, further including operations, features, circuitry, logic, means, or instructions, or any combination thereof for determining a read latency for respective memory cells of the set of memory cells and selecting the set of memory cells based at least in part on the read latency being less than a latency threshold, where the information for the boot sequence is stored in the set of memory cells based at least in part on the set of memory cells being selected.

Aspect 9: The method, apparatus, or non-transitory computer-readable medium of any of aspects 1 through 8 where the timeout duration is for a first portion of the boot sequence, the indication further includes a second indication of a second timeout duration for a second portion of the boot sequence, and the information stored in the set of memory cells is for the first portion of the boot sequence that precedes the second portion of the boot sequence.

Aspect 10: The method, apparatus, or non-transitory computer-readable medium of aspect 9, further including operations, features, circuitry, logic, means, or instructions, or any combination thereof for storing second information associated with the second portion of the boot sequence in a second set of memory cells based at least in part on the second timeout duration and accessing the second information stored in the second set of memory cells during the second portion of the boot sequence.

Aspect 11: The method, apparatus, or non-transitory computer-readable medium of aspect 10, further including operations, features, circuitry, logic, means, or instructions, or any combination thereof for selecting, based at least in part on the timeout duration, the set of memory cells based at least in part on the set of memory cells being associated with a read latency that is less than a latency threshold, an error rate that is less than an error threshold, a quantity of data levels that is less than a data level threshold, or any combination thereof and selecting, based at least in part on the second timeout duration, the second set of memory cells based at least in part on the second set of memory cells being associated with a second read latency that is greater than or equal to the latency threshold, a second error rate that is greater than or equal to the error threshold, a second quantity of data levels that is greater than or equal to the data level threshold, or any combination thereof, where the second information for the boot sequence is stored in the second set of memory cells based at least in part on the second set of memory cells being selected.

Aspect 12: The method, apparatus, or non-transitory computer-readable medium of any of aspects 1 through 11, further including operations, features, circuitry, logic, means, or instructions, or any combination thereof for receiving, subsequent to accessing the information for the boot sequence, a second indication of a second timeout duration for the boot sequence of the host system; storing the information for the boot sequence in a second set of memory cells based at least in part on the second timeout duration; and accessing, after storing the information for the boot sequence in the second set of memory cells, the information stored in the second set of memory cells based at least in part on a subsequent initialization of the boot sequence.

Aspect 13: The method, apparatus, or non-transitory computer-readable medium of any of aspects 1 through 12, further including operations, features, circuitry, logic, means, or instructions, or any combination thereof for receiving a second indication of a second timeout duration for a second boot sequence of a second host system; storing second information associated with the second boot sequence in a second set of memory cells based at least in part on the second timeout duration; and access the second information stored in the second set of memory cells based at least in part on an initialization of the second boot sequence.

Aspect 14: The method, apparatus, or non-transitory computer-readable medium of any of aspects 1 through 13, further including operations, features, circuitry, logic, means, or instructions, or any combination thereof for performing a procedure for building a table associated with accessing a memory device based at least in part on the initialization of the boot sequence and storing one or more checkpoints associated with building the table during the initialization of the boot sequence.

Aspect 15: The method, apparatus, or non-transitory computer-readable medium of aspect 14, further including operations, features, circuitry, logic, means, or instructions, or any combination thereof for receiving a command to perform a reinitialization of the boot sequence and resuming the procedure for building the table from a latest checkpoint of the one or more checkpoints based at least in part on the reinitialization of the boot sequence.

Aspect 16: The method, apparatus, or non-transitory computer-readable medium of any of aspects 1 through 15, further including operations, features, circuitry, logic, means, or instructions, or any combination thereof for performing an error correction procedure for the information accessed during the initialization of the boot sequence; storing one or more checkpoints associated with performing the error correction procedure; receiving a command to perform a reinitialization of the boot sequence; and resuming the error correction procedure from a latest checkpoint of the one or more checkpoints based at least in part on the reinitialization of the boot sequence.

Figure 8:
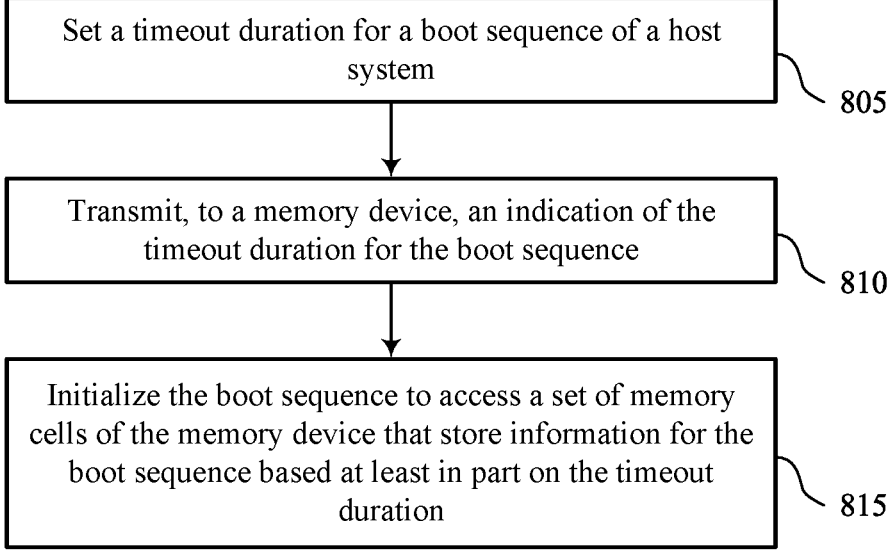

FIG. 8 shows a flowchart illustrating a method 800 that supports determining locations in NAND memory for boot-up code in accordance with examples as disclosed herein. The operations of method 800 may be implemented by a host system or its components as described herein. For example, the operations of method 800 may be performed by a host system as described with reference to FIGS. 1 through 4 and 6. In some examples, a host system may execute a set of instructions to control the functional elements of the device to perform the described functions. Additionally, or alternatively, the host system may perform aspects of the described functions using special-purpose hardware.

At 805, the method may include setting a timeout duration for a boot sequence of a host system. The operations of 805 may be performed in accordance with examples as disclosed herein. In some examples, aspects of the operations of 805 may be performed by a timeout component 625 as described with reference to FIG. 6.

At 810, the method may include transmitting, to a memory device, an indication of the timeout duration for the boot sequence. The operations of 810 may be performed in accordance with examples as disclosed herein. In some examples, aspects of the operations of 810 may be performed by a data component 630 as described with reference to FIG. 6.

At 815, the method may include initializing the boot sequence to access a set of memory cells of the memory device that store information for the boot sequence based at least in part on the timeout duration. The operations of 815 may be performed in accordance with examples as disclosed herein. In some examples, aspects of the operations of 815 may be performed by an initialization component 635 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 17: A method, apparatus, or non-transitory computer-readable medium including operations, features, circuitry, logic, means, or instructions, or any combination thereof for setting a timeout duration for a boot sequence of a host system; transmitting, to a memory device, an indication of the timeout duration for the boot sequence; and initializing the boot sequence to access a set of memory cells of the memory device that store information for the boot sequence based at least in part on the timeout duration.

Aspect 18: The method, apparatus, or non-transitory computer-readable medium of aspect 17, further including operations, features, circuitry, logic, means, or instructions, or any combination thereof for determining the timeout duration for the boot sequence based at least in part on an operating age of the memory device, an average error rate of the memory device, a temperature of the memory device, a power setting of the memory device, or any combination thereof, where setting the timeout duration for the boot sequence is based at least in part on determining the timeout duration for the boot sequence.

Aspect 19: The method, apparatus, or non-transitory computer-readable medium of any of aspects 17 through 18, further including operations, features, circuitry, logic, means, or instructions, or any combination thereof for setting a second timeout duration for the boot sequence of the host system based at least in part on an increase in an operating age of the memory device above an age threshold, an increase in an average error rate of the memory device above an error threshold, an increase in a temperature of the memory device above a temperature threshold, modifying a power setting for the memory device, or any combination thereof.

It should be noted that the described techniques include possible implementations, and that the operations and the steps may be rearranged or otherwise modified and that other implementations are possible. Further, portions from two or more of the methods may be combined.

Aspect 20: An apparatus, including: a processor; memory coupled with the processor; and instructions stored in the memory and executable by the processor to cause the apparatus to: receive an indication of a timeout duration for a boot sequence of a host system; store information for the boot sequence in a set of memory cells based at least in part on the timeout duration; and access the information for the boot sequence that is stored in the set of memory cells based at least in part on an initialization of the boot sequence.

Aspect 21: The apparatus of aspect 20, where the instructions are further executable by the processor to cause the apparatus to: select, based at least in part on the timeout duration, the set of memory cells based at least in part on the set of memory cells being associated with a read latency that is less than a latency threshold, with an error rate that is less than an error threshold, with a quantity of data levels that is less than a data level threshold, or any combination thereof, where the information for the boot sequence is stored in the set of memory cells based at least in part on the set of memory cells being selected.

Aspect 22: The apparatus of aspect 21, where the instructions are further executable by the processor to cause the apparatus to: determine the read latency, the error rate, or both, based at least in part on a temperature of the set of memory cells, where the set of memory cells are selected based at least in part on determining the read latency, the error rate, or both.

Aspect 23: The apparatus of any of aspects 21 through 22, where the instructions are further executable by the processor to cause the apparatus to: determine the latency threshold, the error threshold, the data level threshold, or any combination thereof, based at least in part on the timeout duration, where the set of memory cells are selected based at least in part on the latency threshold, the error threshold, the data level threshold, or any combination thereof.

Aspect 24: The apparatus of aspect 23, where the instructions to determine the latency threshold are executable by the processor to cause the apparatus to: determine average times for completing the boot sequence based at least in part on combinations of the read latency, the error rate, or the quantity of data levels determined for the set of memory cells; and select, based at least in part on the average times for completing the boot sequence, a combination of the latency threshold, the error threshold, the data level threshold, or any combination thereof, that corresponds to an average time of the average times that is less than the timeout duration.

Aspect 25: The apparatus of any of aspects 20 through 24, where the instructions are further executable by the processor to cause the apparatus to: determine an expected error rate for the set of memory cells based at least in part on a measured error rate for the set of memory cells, properties of a set of access lines corresponding to the set of memory cells, a sensing window of the set of memory cells, or any combination thereof; and select the set of memory cells based at least in part on the expected error rate of the set of memory cells being less than an error threshold, where the information for the boot sequence is stored in the set of memory cells based at least in part on the set of memory cells being selected.

Aspect 26: The apparatus of any of aspects 20 through 25, where the instructions are further executable by the processor to cause the apparatus to: determine a quantity of bits configured to be output by respective memory cells of the set of memory cells; and select the set of memory cells based at least in part on the quantity of bits being less than a data level threshold, where the information for the boot sequence is stored in the set of memory cells based at least in part on the set of memory cells being selected.

Aspect 27: The apparatus of any of aspects 20 through 26, where the instructions are further executable by the processor to cause the apparatus to: determine a read latency for respective memory cells of the set of memory cells; and select the set of memory cells based at least in part on the read latency being less than a latency threshold, where the information for the boot sequence is stored in the set of memory cells based at least in part on the set of memory cells being selected.

Aspect 28: The apparatus of any of aspects 20 through 27, where: the timeout duration is for a first portion of the boot sequence, the indication further includes a second indication of a second timeout duration for a second portion of the boot sequence, and the information stored in the set of memory cells is for the first portion of the boot sequence that precedes the second portion of the boot sequence.

Aspect 29: The apparatus of aspect 28, where the instructions are further executable by the processor to cause the apparatus to: store second information associated with the second portion of the boot sequence in a second set of memory cells based at least in part on the second timeout duration; and access the second information stored in the second set of memory cells during the second portion of the boot sequence.

Aspect 30: The apparatus of aspect 29, where the instructions are further executable by the processor to cause the apparatus to: select, based at least in part on the timeout duration, the set of memory cells based at least in part on the set of memory cells being associated with a read latency that is less than a latency threshold, an error rate that is less than an error threshold, a quantity of data levels that is less than a data level threshold, or any combination thereof; and select, based at least in part on the second timeout duration, the second set of memory cells based at least in part on the second set of memory cells being associated with a second read latency that is greater than or equal to the latency threshold, a second error rate that is greater than or equal to the error threshold, a second quantity of data levels that is greater than or equal to the data level threshold, or any combination thereof, where the second information for the boot sequence is stored in the second set of memory cells based at least in part on the second set of memory cells being selected.

Aspect 31: The apparatus of any of aspects 20 through 30, where the instructions are further executable by the processor to cause the apparatus to: receive, subsequent to accessing the information for the boot sequence, a second indication of a second timeout duration for the boot sequence of the host system; store the information for the boot sequence in a second set of memory cells based at least in part on the second timeout duration; and access, after storing the information for the boot sequence in the second set of memory cells, the information stored in the second set of memory cells based at least in part on a subsequent initialization of the boot sequence.

Aspect 32: The apparatus of any of aspects 20 through 31, where the instructions are further executable by the processor to cause the apparatus to: receive a second indication of a second timeout duration for a second boot sequence of a second host system; store second information associated with the second boot sequence in a second set of memory cells based at least in part on the second timeout duration; and access the second information store in the second set of memory cells based at least in part on an initialization of the second boot sequence.

Aspect 33: The apparatus of any of aspects 20 through 32, where the instructions are further executable by the processor to cause the apparatus to: perform a procedure for building a table associated with accessing a memory device based at least in part on the initialization of the boot sequence; and store one or more checkpoints associated with building the table during the initialization of the boot sequence.

Aspect 34: The apparatus of aspect 33, where the instructions are further executable by the processor to cause the apparatus to: receive a command to perform a reinitialization of the boot sequence; and resume the procedure for building the table from a latest checkpoint of the one or more checkpoints based at least in part on the reinitialization of the boot sequence.

Aspect 35: The apparatus of any of aspects 20 through 34, where the instructions are further executable by the processor to cause the apparatus to: perform an error correction procedure for the information accessed during the initialization of the boot sequence; store one or more checkpoints associated with performing the error correction procedure; receive a command to perform a reinitialization of the boot sequence; and resume the error correction procedure from a latest checkpoint of the one or more checkpoints based at least in part on the reinitialization of the boot sequence.

An apparatus is described. The following provides an overview of aspects of the apparatus as described herein:

Aspect 36: An apparatus, including: a processor; memory coupled with the processor; and instructions stored in the memory and executable by the processor to cause the apparatus to: set a timeout duration for a boot sequence of a host system; transmit, to a memory device, an indication of the timeout duration for the boot sequence; and initialize the boot sequence to access a set of memory cells of the memory device that store information for the boot sequence based at least in part on the timeout duration.

Aspect 37: The apparatus of aspect 36, where the instructions are further executable by the processor to cause the apparatus to: determine the timeout duration for the boot sequence based at least in part on an operating age of the memory device, an average error rate of the memory device, a temperature of the memory device, a power setting of the memory device, or any combination thereof, where setting the timeout duration for the boot sequence is based at least in part on determining the timeout duration for the boot sequence.

Aspect 38: The apparatus of any of aspects 36 through 37, where the instructions are further executable by the processor to cause the apparatus to: set a second timeout duration for the boot sequence of the host system based at least in part on an increase in an operating age of the memory device above an age threshold, an increase in an average error rate of the memory device above an error threshold, an increase in a temperature of the memory device above a temperature threshold, modifying a power setting for the memory device, or any combination thereof.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
one or more memory devices; and
processing circuitry coupled with the one or more memory devices and configured to cause the memory system to:
    receive an indication of a timeout duration for a boot sequence;
    store information for the boot sequence in a set of memory cells of a memory device based at least in part on the timeout duration;
    access the information for the boot sequence that is stored in the set of memory cells based at least in part on an initialization of the boot sequence; and
    perform a procedure for building a table associated with accessing the memory device based at least in part on the initialization of the boot sequence.

2. The memory system of claim 1, wherein the processing circuitry is further configured to cause the memory system to:
    prevent a host system from accessing the table during the procedure for building the table.

3. The memory system of claim 1, wherein the processing circuitry is further configured to cause the memory system to:
    store data corresponding to a first checkpoint associated with a partially rebuilt state for the table.

4. The memory system of claim 3, wherein the processing circuitry is further configured to cause the memory system to:
    access, in response to a second initialization of the boot sequence, the data corresponding to the first checkpoint; and
    resume the procedure for building the table using the data corresponding to the first checkpoint.

5. The memory system of claim 1, wherein the processing circuitry is further configured to cause the memory system to:
    initiate an error correction procedure associated with the information for the boot sequence stored in the set of memory cells, wherein the indication of the timeout duration is received after initiating the error correction procedure.

6. The memory system of claim 5, wherein the processing circuitry is further configured to cause the memory system to:
    store data corresponding to a second checkpoint associated with one or more completed operations of the error correction procedure.

7. The memory system of claim 6, wherein the processing circuitry is further configured to cause the memory system to:
    receive an indication of a second initialization of the boot sequence; and resume the error correction procedure based at least in part on storing the data corresponding to the second checkpoint.

8. The memory system of claim 1, wherein the processing circuitry is further configured to cause the memory system to:
    select, based at least in part on the timeout duration, the set of memory cells based at least in part on the set of memory cells being associated with a read latency that is less than a latency threshold, with an error rate that is less than an error threshold, with a quantity of data levels that is less than a data level threshold, or any combination thereof, wherein the information for the boot sequence is stored in the set of memory cells based at least in part on the set of memory cells being selected.

9. A method, comprising:
receiving an indication of a timeout duration for a boot sequence;
storing information for the boot sequence in a set of memory cells of a memory device based at least in part on the timeout duration;
accessing the information for the boot sequence that is stored in the set of memory cells based at least in part on an initialization of the boot sequence; and
performing a procedure for building a table associated with accessing the memory device based at least in part on the initialization of the boot sequence.

10. The method of claim 9, further comprising:
preventing a host system from accessing the table during the procedure for building the table.

11. The method of claim 9, further comprising:
storing data corresponding to a first checkpoint associated with a partially rebuilt state for the table.

12. The method of claim 11, further comprising:
accessing, in response to a second initialization of the boot sequence, the data corresponding to the first checkpoint; and
resuming the procedure for building the table using the data corresponding to the first checkpoint.

13. The method of claim 9, further comprising:
initiating an error correction procedure associated with the information for the boot sequence stored in the set of memory cells, wherein the indication of the timeout duration is received after initiating the error correction procedure.

14. The method of claim 13, further comprising:
storing data corresponding to a second checkpoint associated with one or more completed operations of the error correction procedure.

15. A non-transitory computer-readable medium storing code, the code comprising instructions executable by one or more processors to:
receive an indication of a timeout duration for a boot sequence;
store information for the boot sequence in a set of memory cells of a memory device based at least in part on the timeout duration;
access the information for the boot sequence that is stored in the set of memory cells based at least in part on an initialization of the boot sequence; and
perform a procedure for building a table associated with accessing the memory device based at least in part on the initialization of the boot sequence.

16. The non-transitory computer-readable medium of claim 15, wherein the instructions are further executable by the one or more processors to:

prevent a host system from accessing the table during the procedure for building the table.

17. The non-transitory computer-readable medium of claim 15, wherein the instructions are further executable by the one or more processors to:

store data corresponding to a first checkpoint associated with a partially rebuilt state for the table.

18. The non-transitory computer-readable medium of claim 17, wherein the instructions are further executable by the one or more processors to:

access, in response to a second initialization of the boot sequence, the data corresponding to the first checkpoint; and resume the procedure for building the table using the data corresponding to the first checkpoint.

19. The non-transitory computer-readable medium of claim 15, wherein the instructions are further executable by the one or more processors to:

initiate an error correction procedure associated with the information for the boot sequence stored in the set of memory cells, wherein the indication of the timeout duration is received after initiating the error correction procedure.

20. The non-transitory computer-readable medium of claim 19, wherein the instructions are further executable by the one or more processors to:

store data corresponding to a second checkpoint associated with one or more completed operations of the error correction procedure.

* * * * *